(12) United States Patent
Sudhir

(10) Patent No.: US 9,402,511 B2
(45) Date of Patent: Aug. 2, 2016

(54) COOKING APPARATUS

(76) Inventor: Sanandan Sudhir, Delhi (IN)

(*) Notice: Subject to any disclaimer, the term of this patent is extended or adjusted under 35 U.S.C. 154(b) by 496 days.

(21) Appl. No.: 13/991,163

(22) PCT Filed: Dec. 21, 2011

(86) PCT No.: PCT/IN2011/000882
§ 371 (c)(1),
(2), (4) Date: Apr. 9, 2014

(87) PCT Pub. No.: WO2012/085944
PCT Pub. Date: Jun. 28, 2012

(65) Prior Publication Data
US 2015/0144006 A1 May 28, 2015

(30) Foreign Application Priority Data
Dec. 21, 2010 (IN) .......................... 3051/DEL/2010

(51) Int. Cl.
*A47J 44/00* (2006.01)
*A47J 27/00* (2006.01)
*A47J 36/02* (2006.01)

(52) U.S. Cl.
CPC ................ *A47J 44/00* (2013.01); *A47J 27/002* (2013.01); *A47J 36/02* (2013.01); *A47J 36/027* (2013.01)

(58) Field of Classification Search
CPC ....... A47J 27/003; A47J 44/00; A47J 36/027; A47J 36/02
USPC ............ 99/339, 340, 342; 219/391, 393, 400, 219/683, 716, 738, 757
See application file for complete search history.

(56) References Cited

U.S. PATENT DOCUMENTS

| | | | |
|---|---|---|---|
| RE31,637 E * | 7/1984 | Yoshida | F24C 15/322 126/273 R |
| 6,680,467 B1 * | 1/2004 | Whipple, Jr. | H05B 6/6402 219/697 |
| 6,815,644 B1 * | 11/2004 | Muegge | F24C 1/04 126/332 |
| 2007/0251936 A1 * | 11/2007 | Nam | F24C 15/166 219/413 |

* cited by examiner

*Primary Examiner* — Thien S Tran
(74) *Attorney, Agent, or Firm* — D'Ambrosio & Menon, PLLC; Usha Menon

(57) ABSTRACT

The present invention discloses an apparatus and method that combines traditional open flame cooking and modern cooking techniques (including, but not limited to, convection cooking, conduction cooking, microwave cooking etc). It not only allows traditional cooking steps that take place in open flame but also gives the user an option to switch over to other cooking technique to complete the cooking.

10 Claims, 2 Drawing Sheets

COOKING APPARATUS

FIELD OF INVENTION

The present invention relates to an apparatus and method that for efficient cooking. More specifically, it relates to a cooking apparatus that uses dual source of energy and can efficiently switch over between the two modes based on the discretion of the user.

BACKGROUND OF THE INVENTION

Traditional cooking in Asian countries, and particularly India, has almost unarguably involved open flame cooking. Almost all cuisines and culinary practices developed in these countries have relied on the open flame method of cooking. This method of cooking has been in practice since time immemorial and with changing times and tastes, people have generally developed new cooking methods but centered on the same open flame cooking technique. For instance, preliminary heating, pre-frying, and roasting spices before cooking in open flame and oil is practiced. Similarly, to provide dry, crisp external surface for the ingredients in the dish, main ingredients are cooked in open flame before boiling or heating it with higher water content for complete cooking.

Even with the advent of modern cooking techniques, and specially the microwave technique, a substantial number of the cooking house-hold still prefer the open flame cooking as their sole cooking technique. Such modern cooking techniques has definitely made the modern day cooking fast, easy, cost & time efficient, but, in public minds, still is not able to match up with the goodness of a traditional open flame cooking.

These modern cooking techniques depend mostly on an electrical supply as the power source. With a fluctuating electrical supply in most parts of any developing nation, including India, the primary concern in a user's mind is a loss of time and other resources, if and when, the electrical supply gets off in the course of cooking Indian households also find it difficult to do an investment in money and space that separate cooking instruments dedicated to different styles of cooking might entail on them.

There is, therefore, a need in the art to provide for a cooking apparatus that combines the benefits of both open flame and other modern cooking techniques cooking into a single apparatus, giving user a much desired advantage of savoring his taste buds by dishes made from different styles of cooking as well as saving cost and space.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

SUMMARY OF THE INVENTION

The present invention discloses an apparatus and method that combines traditional open flame cooking and modern cooking techniques (including, but not limited to, convection cooking, conduction cooking, microwave cooking etc). It not only allows traditional cooking steps that take place in open flame but also gives the user an option to switch over to other cooking technique to complete the cooking.

DETAILED DESCRIPTION OF THE INVENTION

In an embodiment of the invention, a cooking apparatus with a dual source of energy is provided. One of them is based on a traditional open flame and includes flame from gas, naphtha, kerosene like inflammable liquids, wood, coal, electric heating coil, hot gases, steam, superheated steam and vaporized liquid or gases. The other source of energy is based on a modern cooking technique. In a preferred embodiment, the modern cooking technique is a microwave based cooking technique.

Figure 1:
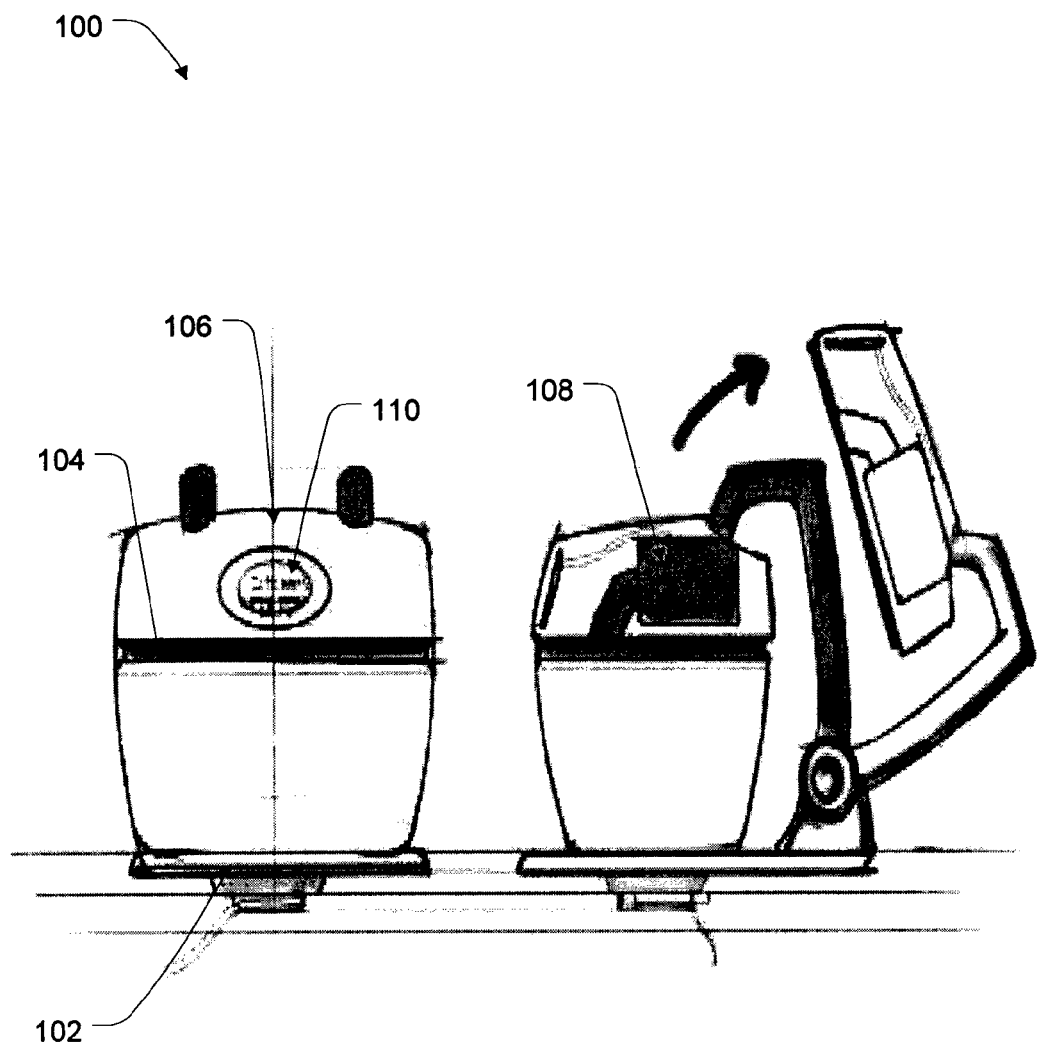
FIG. 1 illustrates an exemplary cooking apparatus according an embodiment of the present invention.

As shown in FIG. 1, a cooking apparatus 100 according an embodiment of the present invention provides for a dual mode of operation with distinct features for an open flame cooking and microwave cooking. In an embodiment, the cooking apparatus 100 includes a base portion 102, a temperature resistant gasket 104, and a top portion 106. The base portion 102 includes a cavity, made preferably from steel, which forms part of the cooking area for a traditional flame-based cooking. The base portion 102 can receive flame from a conventional flame source having any orientation ensuring flexibility as to the side from which the heat source is given. The cooking apparatus 100 of the present invention is compatible with working on all known sources of open flame energy sources, including but not limited to, convection, radiation, hot gas, steam, and induction. The top portion 106 of the cooking apparatus 100 can be configured to provide a requisite microwave radiation to carry out an alternate cooking method. In an embodiment, the top portion 106 can further comprise of a magnetron based unit 108 configured to generate microwave radiation essential for the functioning of the top portion 106 of the cooking apparatus 100. In a preferred embodiment, the top portion 106 can be covered by a lid that surrounds the top portion 106 and moves on a hinged joint to open or close the lid over the top portion 106. In yet another embodiment, the top portion 106 can be made from ceramic material.

The top portion 106 and the base portion 102 of the cooking apparatus 100 can be separated by a temperature resistant gasket 104, which not only acts as a physical separator between the two portions but also helps manage an effective temperature range in the respective portions of the cooking apparatus 100.

In an embodiment, the exterior of the top portion 106 of the cooking apparatus 100 can have a UI display 110 to indicate temperature or time related to either of the top portion 106 or of the base portion 102 of the cooking apparatus 100.

In its working, the cooking apparatus 100 operates both on the traditional mode of flame-based cooking and the modern technique of cooking, preferably microwave. Typical operation may start with an open position of the top portion 106 of the cooking apparatus 100, and the entire cooking taking place on open flame. The open position of the top portion 106 can allow cooking, mixing, adding, and browning of the ingredients. After this first phase, the microwave lid can be closed down and the operator can switch on the microwave to quickly complete cooking.

In an embodiment, cooking can start with the top portion 106 of the cooking apparatus 100, intervened by open flame cooking at the base portion 102. In yet another embodiment, the cooking apparatus 100 can either be user controlled or can be automated for convenient and faster processing.

Figure 2:
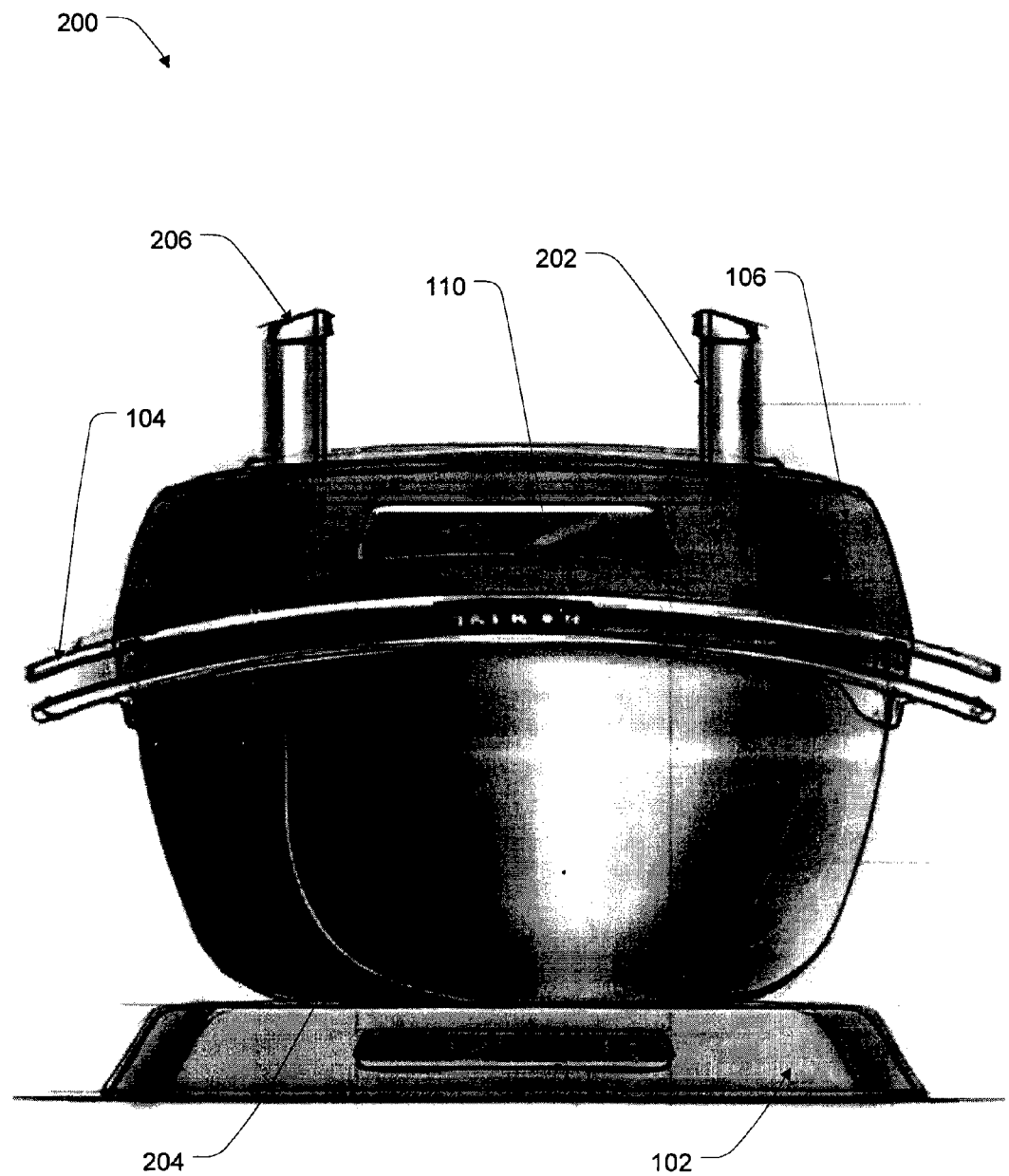
FIG. 2 illustrates another exemplary cooking apparatus according an embodiment of the present invention.

FIG. 2 illustrates another exemplary cooking apparatus according an embodiment of the present invention.

FIG. 2 shows a cooking apparatus 200 comprising a base portion 102 and a top portion 106 separated by a temperature resistant gasket 104. In an embodiment, the base portion 102 can be a hot plate or an insulation plate, which controls both the hot plate as well as the top portion 106, which functions as a microwave.

In another embodiment, the cooking apparatus 200 further comprises of a base container 204 for cooking the food. In an embodiment, the base container 204 has a food grade enamel coating from inside, which is safe and compatible with microwave and induction hot plate.

In another embodiment, the temperature resistant gasket 104 comprises a handle and gas insulation plate to grip and ensure that there is no inadvertent use. In yet another embodiment the temperature resistant gasket 104 is a transparent glass plate to ensure that the ingredients inside the base container are visible.

In an embodiment, the top portion 106 has a ceramic and/or metal body with insulation base plate to ensure that the base heat does not affect the container on top. The top portion 106 can also have a display 110 to show the power being consumed by microwave. The display can also be configured to display and configure the program mode.

In yet another embodiment, the cooking apparatus 200 comprises of vertical gas springs 202 to take the load of the lid. The cooking apparatus 200 further comprises stoppers 206 to ensure that the top portion 106 stops and can then turn around the hinge to open further. The stoppers can further allow the top to rotate around the vertical axis.

In another embodiment, the base portion 102 can further comprise of a display to show the power being consumed along with other desired parameters. In yet another embodiment of the invention, the top portion 106 and base portion 102 are detachable from each other and can be configured to work with each other when desired by the user.

In another embodiment, the base container can be multiple shapes and sizes and configurable with the top portion 106 as well as with the base portion 102. In yet another embodiment, the top portion 102 can simply be lifted from the base container by the user without the use of a hinge or vertical gas spring mechanism. The top portion 102 can, as stated above, also be configured to move up and down to allow conventional cooking and then brought down for use as a microwave.

We claim:

1. A cooking apparatus configured to allow multiple cooking modes, the apparatus comprising:
    a base portion configured for traditional open flame cooking;
    a top portion configured for microwave cooking; and
    a lid configured to surround the top portion and further configured to move on a hinged joint to open or close the top portion;
    wherein the traditional open flame cooking takes place in the open position of the top portion and the open flame heat source is externally applied to the base portion; and
    wherein the microwave cooking take place in the closed position of the top portion.

2. The cooking apparatus of claim 1, wherein said cooking apparatus is configured to allow either or a combination of simultaneous and iterative use of, the traditional open flame cooking and the microwave cooking.

3. The cooking apparatus of claim 1, wherein said base portion comprises a cavity, wherein said cavity forms part of cooking area for the traditional open flame cooking, and wherein heat source for the traditional open flame cooking is any one or a combination of flame from gas, naphtha, kerosene like inflammable liquids, wood, coal, and other heat sources such as electric heating coil, hot uses, steam superheated steam and vaporized liquid, induction, convection.

4. The cooking apparatus of claim 1, wherein said top portion comprises a magnetron based unit for generating microwave radiation for allowing the microwave cooking.

5. The cooking apparatus of claim 1, wherein said top portion and said base portion are separated by a temperature resistant gasket, wherein said temperature resistant gasket manages an effective temperature range in said top portion and said base portion.

6. The cooking apparatus of claim 1, wherein said cooking apparatus comprises a base container on said base portion for holding and cooking food.

7. The cooking apparatus of claim 1, wherein said cooking apparatus comprises a display to indicate one or more of temperature, power consumed, and time related to either of said top portion or of said base portion.

8. The cooking apparatus of claim 1, wherein the top portion is detachable from the base portion.

9. The cooking apparatus of claim 1, wherein said top portion further comprises a first means for taking load of said lid in the open position and a second means for opening and rotating said top portion over said hinged joint.

10. The cooking apparatus of claim 1, wherein said cooking apparatus is either user controlled or is automated for convenient and faster processing.

* * * * *